Sept. 30, 1969    H. WONELL ET AL    3,469,812
ADJUSTABLE VEHICLE SEAT MOUNTING
Filed Feb. 9, 1967    4 Sheets-Sheet 1
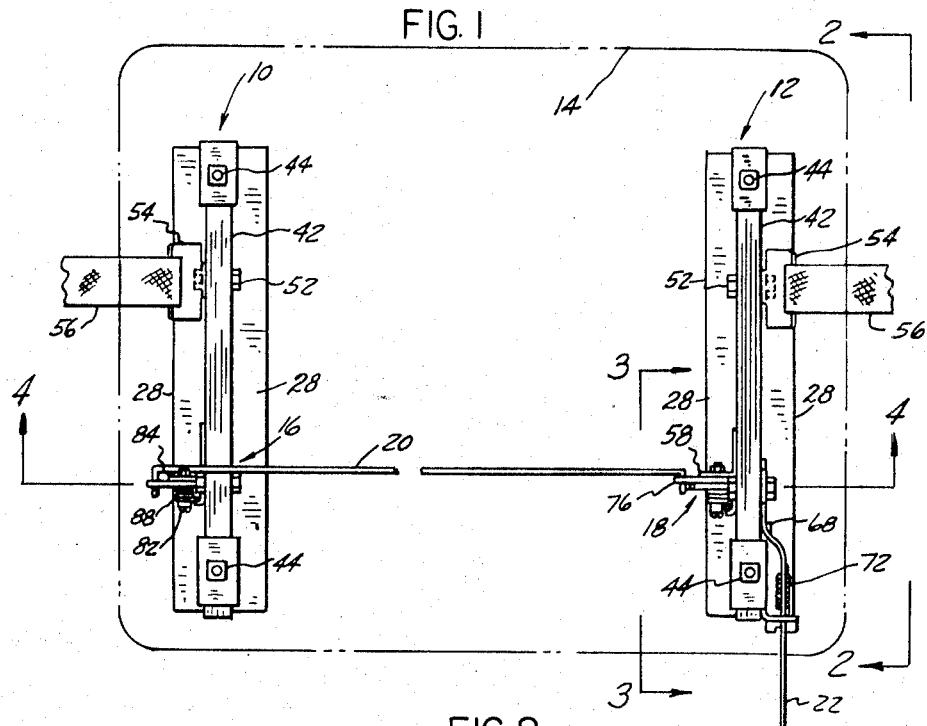
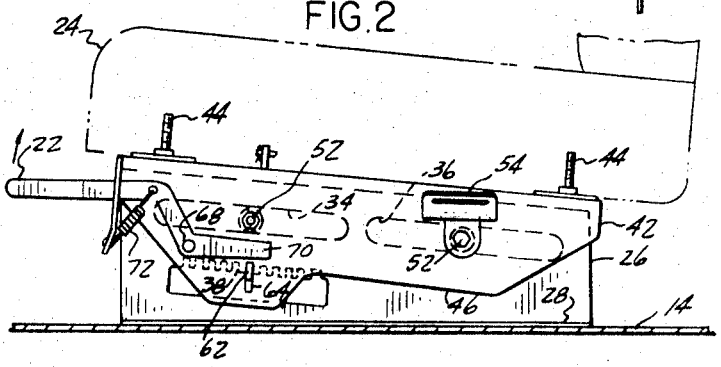
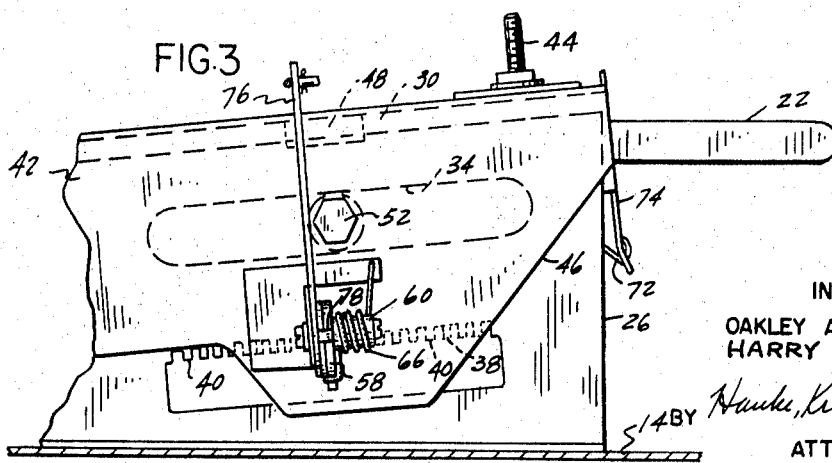
INVENTORS
OAKLEY A. La FLECHE
HARRY WONELL
BY Hauke, Krass, & Gifford
ATTORNEYS

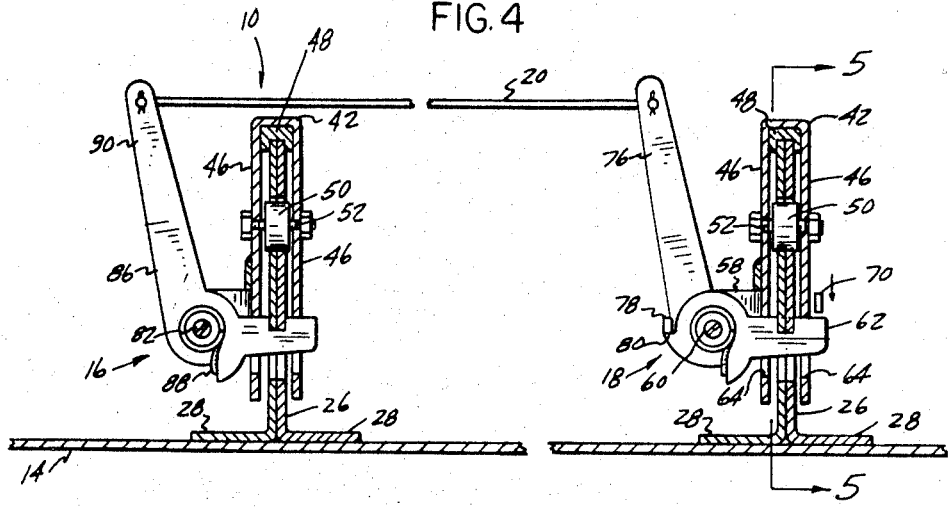
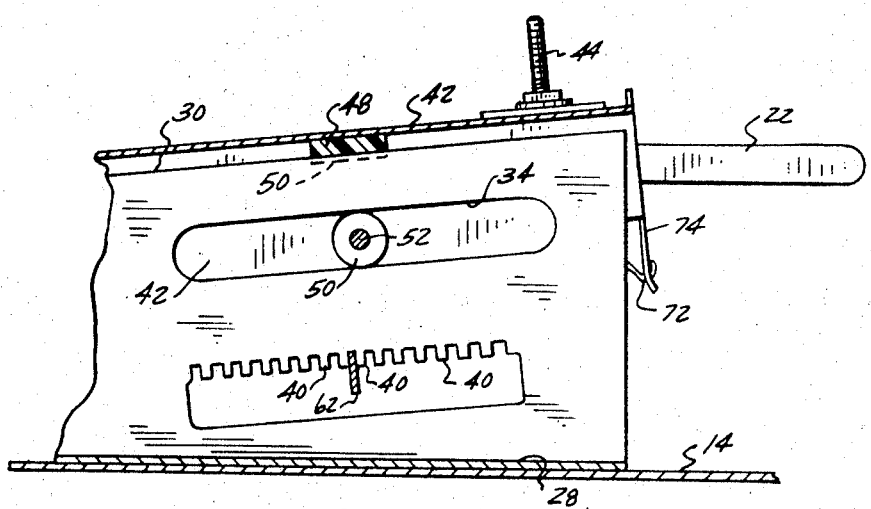

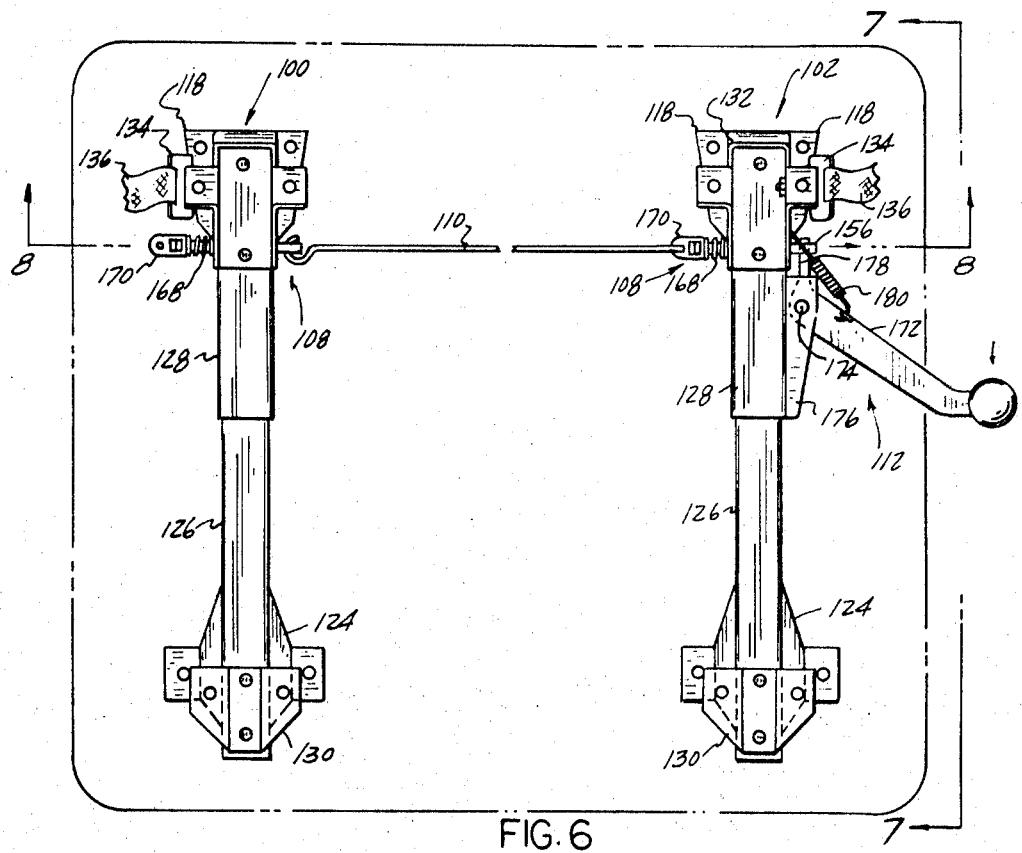

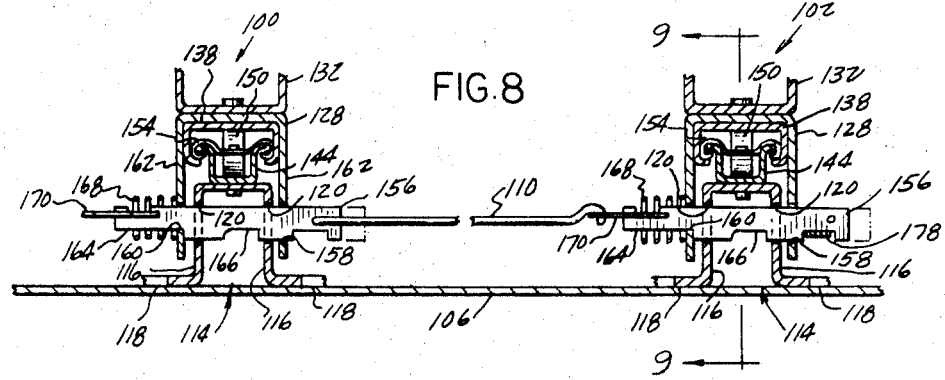
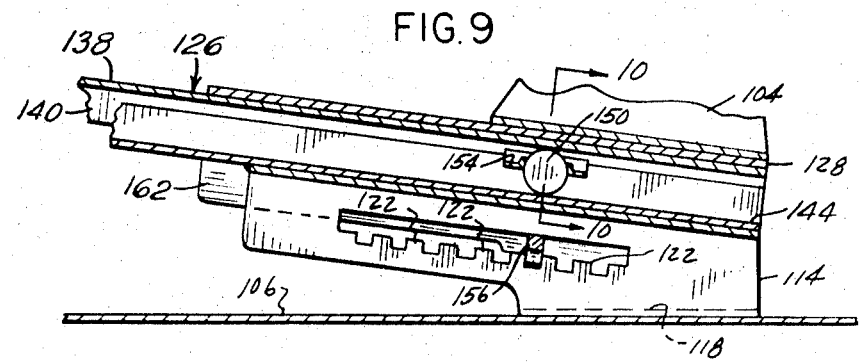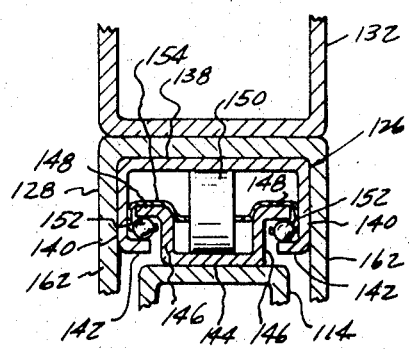

United States Patent Office 3,469,812
Patented Sept. 30, 1969

3,469,812
ADJUSTABLE VEHICLE SEAT MOUNTING
Harry Wonell, Westland, and Oakley A. LaFleche, Mount Clemens, Mich., assignors to Howell Industries, Inc., Detroit, Mich., a corporation of Michigan
Filed Feb. 9, 1967, Ser. No. 614,863
Int. Cl. B60n 1/08; F16m 13/00
U.S. Cl. 248—430          6 Claims

ABSTRACT OF THE DISCLOSURE

A pair of interconnected, internally spaced apart slide devices arranged to support a seat assembly between longitudinally spaced positions relative to the floor of a vehicle. Each slide device includes an upper support member for attachment to the seat unit, a lower support fixed to the vehicle floor, means providing a track between the upper and lower support members and latch means for locking the upper and lower supports at a selected relative position. The upper support member also has means for anchoring the terminal ends of a safety belt assembly associated with the seat assembly. The upper support also has a pair of rigid flange sections straddling a slide unit and arranged to prevent separation of the slide unit components. The latching means includes a latch member associated with each of the slide devices and interconnected one to the other for cooperative movement between a first position wherein the latches engage a selected pair of teeth formed in the lower fixed supports to lock the two supports one to the other and a second position wherein the latches disengage the teeth to free the upper movable supports for longitudinal movement relative to their respective lower fixed supports.

BACKGROUND OF THE INVENTION

Field of the invention

This invention relates to a vehicle seat and more particularly to an adjustable supporting apparatus permitting a seat assembly to be selectively locked in various adjusted positions relative to a fixed portion of the vehicle.

Description of the prior art

Conventional adjustable seat devices comprise a pair of laterally spaced, supporting apparatus having an individual latching means interconnected one to the other and operatively connected to a release handle. The supporting apparatus normally takes the form of an upper support attached to the seat assembly, a lower support fixed to the floor of the vehicle and some sort of slide mechanism interconnecting the upper and lower supports for relative longitudinal movement parallel to the longitudinal axis of the vehicle. A latch mechanism associated with the supporting device permits the upper and lower supports to be locked in a selected relative position generally corresponding to the physical dimensions of the occupant of the seat.

Conventional adjustable seat mounting devices of the aforementioned type have a number of drawbacks generally related to safety features and reflected in the degree of distortion that takes place in the device during a sudden deceleration produced by a collision or similar type of accident. One disadvantage is related to the slide assembly interconnecting upper and lower support members.

Normally the slide assembly comprises a pair of companion, elongated, U-shaped slide members having laterally formed portions of their sidewalls interconnected to one another by ball or roller bearings arranged to provide a relatively frictionless adjustment. Inertial forces acting on the seat assembly during a sudden deceleration produce a transverse force on the slide assembly tending to bend the sidewalls outwardly so that they separate or "peel" one from the other. The preferred embodiment of the present invention obviates this problem by providing an upper support member arranged to prevent the lateral bending of the sidewalls of the slide members so that their relative separation is prevented.

Another problem of the seat mounting apparatus of the prior art is related to the means for anchoring the fixed end of safety seat belt devices. It is common practice to anchor the terminal ends of seat belts to a fixed lower portion of the vehicle, normally the floor. The reason for this arrangement is to prevent a sudden displacement of the occupant of the seat relative to the vehicle in the event of a sudden deceleration so that the occupant is not thrown against various injury producing portions of the interior of the vehicle. The disadvantage of this arrangement is that while the seat belt assembly restrains the occupant against a forward displacement, high inertial forces tend to force the seat assembly forward so that the occupant is sandwiched between the seat belt and the seat assembly and incurs serious internal injuries. The preferred embodiment of the present invention obviates this problem by providing means for anchoring the terminal ends of the seat belt assembly to the movable portion of the seat mounting apparatus so that the seat belt, the occupant, and the seat assembly are shifted forward as the unit.

Another problem associated with conventional slide devices is related to the means for locking the companion support members one to the other at a fixed relative position. Conventional latch devices take the form of a latch member pivotally attached to one of the slide members and engageable with a series of teeth formed in the opposite slide member. This latching arrangement has two serious disadvantages which take the form of a reduction in the stress-transmitting sections of the slide members. The teeth are normally provided in a flange section of one of the slide members thereby removing portions of a stress-transmitting area. Furthermore, the latch arrangement normally is pivotally supported so that an elongated aperture having a length corresponding to the arc of motion of the latch is required in the supporting members thereby reducing additional stress-transmitting portions. The preferred embodiment of the present invention obviates these structural weakening problems by providing a ratchet locking device separate from the slide members and also a novel form of non-pivotal latch arrangement supported for lateral movement along an axis so that its associated apertures have a minimum size.

SUMMARY

The preferred embodiment of the present invention takes the form of a U-shaped, downward facing, channel support member attached to the floor of the vehicle and interconnected through a suitable slide assembly to a movable support member adapted for attachment to the seat assembly. The movable support member has a generally U-shaped cross-section including a pair of rigid downwardly depending flanges straddling the fixed support member. A suitable slide device is arranged between the flange portions to provide means for sliding movement between the support members. The flange portions of the movable support provide a rigid reinforcement for preventing separation of the slide assembly components in the event of a sudden deceleration.

The lower fixed support is provided with a series of teeth and connecting slots each of which is associated with a selected relative position of the seat assembly with respect to the floor of the vehicle. The flange portions of the movable support are apertured to receive a latch member laterally movable relative to the direction of longitudinal movement of the support members. The latch member is provided with suitable notches and abutment portions and is displaceable between a first lateral position wherein the abutment portions engage a selected tooth in the fixed support to rigidly lock the two supports one to the other and a second lateral position wherein the notches register with the teeth so that the upper movable support is free for longitudinal movement with respect to the lower fixed support.

Preferably the slide devices are arranged in laterally spaced pairs to the floor of the vehicle with the slide device associated with the driver side provided with a suitable handle engageable with the latch member. The two latch members are interconnected through a wire member for simultaneous operation.

It is therefore an object of the present invention to provide a safer adjustable seat mounting device for a vehicle having a seat belt assembly for restraining an occupant disposed in the seat assembly by providing means for anchoring the terminal ends of the seat belt assembly to the movable sections of the seat mounting device.

It is another object of the present invention to improve the construction of adjustable seat mounting devices having a movable support member connected to a fixed support member through a slide assembly by providing a movable support member having rigid, unyielding flange portions straddling the slide assembly to prevent separation of the components thereof.

It is a still further object of the present invention to prevent peeling or separation of the interengaged sidewalls of the companion members of slide assemblies in adjustable seat mounting apparatus by providing a rigid reinforcing member having spaced side flanges arranged to prevent lateral movement of the sidewalls of the companion slide members.

A still further object of the present invention is to provide an improved latching arrangement for locking the movable portion of a seat mounting apparatus to the fixed portion by providing a non-pivotal latch member engageable with a selected one of a series of teeth formed in one of the supporting members and which is laterally displaceable along an axis normal to the axis of relative movement of the two supporting members.

Still another object of the present invention is to provide an improved adjustable seat mounting apparatus comprising a pair of spaced apart adjustable seat devices having interconnected latch members displaceable along an axis normal to the direction of relative movement of the seat devices.

Still further objects and advantages of the present invention will readily occur to one skilled in the art to which the invention pertains upon reference to the following detailed description.

BRIEF DESCRIPTION OF THE DRAWINGS

The description refers to the accompanying drawings in which like reference characters refer to like parts throughout the several views and in which;

FIG. 1 is a plan view illustrating a pair of interconnected slide devices illustrating one preferred embodiment of the invention;

FIG. 2 is an elevational view taken along lines 2—2 of FIG. 1;

FIG. 3 is an enlarged fragmentary view taken along lines 3—3 of FIG. 1;

FIG. 4 is a view taken along lines 4—4 of FIG. 1 and illustrating the cross section of the preferred slide devices;

FIG. 5 is an enlarged fragmentary view similar to the view illustrated in FIG. 3 but with parts broken away for purposes of description;

FIG. 6 is a plan view illustrating an alternate form of slide device illustrating the invention and in particular showing the preferred latching arrangement;

FIG. 7 is a view of the slide device illustrated in FIG. 6 and taken along lines 7—7 of FIG. 6;

FIG. 8 is a transverse sectional view of the arrangement illustrated in FIG. 6 and taken along lines 8—8 of FIG. 6;

FIG. 9 is an enlarged fragmentary view as seen from lines 9—9 of FIG. 8; and

FIG. 10 is an enlarged fragmentary cross-sectional view taken along lines 10—10 of FIG. 9.

DESCRIPTION OF THE PREFERRED EMBODIMENTS

Referring to the drawings, FIGS. 1 to 5 illustrate one preferred seat mounting arrangement as comprising a pair of laterally spaced slide devices 10 and 12 provided with latching mechanisms 16 and 18 interconnected by a wire 20. A handle 22 is operably connected to the latch mechanisms 16 and 18 to produce simultaneous engagement and disengagement thereof in a manner which will be subsequently described. The slide devices 10 and 12 are arranged to support a seating unit 24 for relative adjustable displacement with respect to the floor 14.

Slide devices 10 and 12 each include a lower support member 26 having a pair of laterally directed flange portions 28 adapted for connection to the floor 14 by suitable means.

The lower supports 26 each have an upright section defining an elongated track 30 generally running in a fore and aft direction with respect to the vehicle. Each upright support 26 is also provided with a pair of elongated slots 34 and 36 having side edges running parallel to the track 30. A rack 38 is provided in each lower support 26, spaced below the slot 34. Each rack 38 has a series of teeth 40 extending in a direction parallel to the side edges of the slots 34 and 36 and the track 30. The rack 38 has a length defining the limits of longitudinal displacement between the seat 24 and the floor 14.

As can best be seen in FIGS. 2, 3 and 5 an upper support member 42 mounted on each of the lower support members 26 has upwardly directed threaded members 44 to provide a means for attachment to the seat assembly 24.

The upper support member 42 has a pair of spaced, downwardly depending flange sections 46 (FIG. 4) straddling the lower support 26.

Referring to FIGS. 4 and 5, a pair of nylon spacers 48, only one of which is shown, are retained in notches 51 formed in the track 30 and provide a slidable engagement with the upper support member 42.

Each upper support member 42 is also provided with a pair of spaced apart roller bearings 50 each journaled on a stud member 52 carried by the flanges 46. As can best be seen in FIG. 5, the roller members 50 are each associated with a slot 34 and received therein to provide a rolling, anti-friction engagement between the upper support member 42 and the lower support member 26. Preferably the roller members 50 have a diameter corresponding to the distance between the side edges of the slots 34 to eliminate any play or looseness between the support members.

Each of the rearward studs 52 associated with the rearward roller members 50 also provide means for attaching a seat belt fixture 54 (FIG. 1). The fixtures 54 provide a means for anchoring the looped terminal ends of seat belts 56. Thus it can be seen that the seat belts 56 move with the upper movable support member 46 as it is adjusted between forward and rearward positions relative to the lower support 26. Furthermore it can be seen that when the latching means 16 and 18 are in a disengaged position the upper support members 42 are freely movable with respect to the lower support member 26.

Now referring to FIGS. 1, 3 and 4, the latching means comprises a flange 58 extending normally to the inner flange 46 of the slide device 12. A pin 60 is carried by the flange 58 and is supported on an axis generally parallel to the rack 38. As can best be seen in FIG. 4, a latch member 62 is carried by the pin 60 and extends through vertically, elongated apertures 64 provided in each of the flanges 46. The apertures 64 register with the rack 38 so that the latch 62 is pivotal between a raised position wherein it engages a selected pair of teeth 40 to interlock the upper support 42 to the lower support 26 and a lowered position wherein it releases the teeth 40 to permit free movement of the supper support member 42 with respect to the lower support 26. As can best be seen in FIG. 3, a spring biased member 66 wrapped around the spring 60 has one end acting against the flange 46 and its opposite end reacting against the latch member 62 to maintain it in a normally raised position.

Referring to FIGS. 1 and 2, the handle 22 is pivotally connected by a pin 68 to the outer flange 46 and has an end portion 70 arranged to engage the outer end of the latch member 62. Thus by raising the outer end of the handle 22, the end portion 70 produces a downward force on the latch 64 sufficient to disengage the latch from the rack to permit slidable movement of the upper support member 42 with respect to the lower support 26. The outer end of the handle 22 is normally maintained in a lowered downward position by a spring member 72 having one end connected to the handle 22 and the opposite end engaged with a lateral flange 74 carried by the flange 46.

As can best be seen in FIGS. 1 and 4, a lever member 76 is supported for pivotal movement to the pin 60 and carries a finger 78 engageable with an abutment 80 provided in the lever 62. The lever is arranged for pivotal movement toward and away from the upper support 42. When the handle 22 is raised to lower the latch 62 from disengagement with the rack 38, the abutment 80 produces an upward force on the finger 78 so that the lever 76 pivots toward the right as viewed in FIG. 4.

The latch 16 of the slide device 10 comprises a pin 82 supported by a flange 84 in a manner similar to the supporting arrangement for the pin 60 in the latch mechanism 18. A latch member 86 is journaled to the pin and pivotal between a raised position wherein it engages the rack 38 of the slide device 10 and a lowered position wherein it disengages its associated rack 38. Spring 88 is wrapped around the pin 82 to act against the flange 46 and react against the latch 86 to normally maintain the latch 86 in a raised position.

The latch 86 is also provided with an upwardly directed lever member 90 having its free end connected to the wire 20. Thus it can be seen that the lever 76 and 90 are movable in combination so that when the handle 26 is raised to disengage the latch 62 that the latch 86 is simultaneously lowered to disengage its associated rack.

As thus far described, I have illustrated in detail a rugged slide assembly comprising a relatively few parts and having a movable upper support member 42 arranged so that its downwardly depending flange sections prevent separation from the lower support member 26 by the studs 52, the rollers 50 and the latch and rack assembly.

Now referring to FIGS. 6 to 10, an alternate embodiment of the present invention is illustrated as comprising a pair of laterally spaced slide devices 100 and 102 arranged to provide a mounting for a seat assembly 104 above a floor panel 106. The slide devices 100 and 102 are provided with latch means 108 interconnected by a wire member 110 as viewed in FIG. 6. A handle assembly 112 is operatively connected to the latch mechanism 108 of slide device 102 and is arranged to produce simultaneous operation of the two latch mechanisms 108.

It is to be understood that the slide devices 100 and 102 are similar except that the slide device 102 carries a handle assembly 112. As can best be seen in FIG. 8, each slide device includes a rearward elongated lower support member 114 having a generally U-shaped cross section including spaced sidewalls 116 and laterally directed flanges 118 adapted for a permanent attachment to the floor panel 106.

As can best be seen in FIG. 9, a rack 120 is defined in each of the sidewalls 116 of the supports 114, each rack 120 consisting of a series of spaced teeth 122 and connecting slots. The rack 120 extends in a slightly inclined relationship with respect to the floor panel 106 and has a length corresponding to the desired limits of relative displacement of the seat assembly 104 and the floor panel 106.

A forward support member 124 is spaced forwardly of each of the rearward supports 114 and is fixed to the floor panel 106. The support members 124 have a generally U-shaped cross section with an upper surface inclined at an angle to form an extension of the upper surface of the supports 114.

A slide assembly 126 is supported on the upper portions of each pair of the supports 124 and 114. The slide assemblies 126 provide a means for supporting an upper elongated support member 128 for longitudinal movement relative to the forward supports 114 and 124. The upper support member 128 is engaged with the lower support member 114 through the latch means 108 in a manner which will be subsequently described.

As best seen in FIGS. 6 and 7, a wing shaped support member 130 is also fixed to the slide assembly 126 and is intended to provide means for attaching the slide assembly 126 directly to the seat assembly 104. A bracket 132 attached to the upper support 128 is intended for attaching the seat assembly 104. A seat belt anchor 134 is connected to each of the brackets 132 and anchors the lower looped ends of a seat belt 136. Thus the seat belts 136 are movable with the seat assembly 104 and the upper supports 128 as the seat 104 is adjusted relative to the floor 106 of the vehicle.

As can best be seen in FIG. 10, the slide assembly 126 comprises an upper channel shaped member 138 having downwardly depending sidewalls 140 terminating with inwardly directed lip portions 142.

A lower channel shaped member 144 having spaced walls 146 is provided with laterally directed lips 148. Anti-friction means are disposed between the upper and lower channels which include a pair of spaced rollers 150 only one of which is shown, and ball elements 152 retained by retainer member 154 mounted on lower channel 144. The rollers 150 function to transmit the vertical load through the slide device and the ball elements 152 stabilize the two companion channel members against sidesway.

Now as can best be seen in FIG. 8, an elongated latch member 156 is associated with each of the slide devices and disposed in a pair of apertures 158 and 160 provided in the sidewalls 162 of the upper support 128. The apertures 158 and 160 register with the racks 120 so that the latches 156 are engageable with the teeth 122. Each of the latches 156 has a narrowed end 164 and a notch 166. As viewed in FIG. 8, the narrow end 164 and notch 166 are arranged so that when the latches 156 are in their extreme left position they are in abutment with the left sidewall 162 and the body of each latch registers between a selected pair of teeth 122 to lock the upper supports 128 and the lower supports 114 against relative longitudinal movement. The latches are movable to the right wherein the narrowed portion 160 and the notch 166 register with the teeth 122 provided in the sidewalls 116 of the lower supports to permit relative movement between the upper and lower support members 128 and 114. The two latches 156 are interconnected by the wire 110 so that they are engaged or disengaged with respect to the racks 120 in a simultaneous relationship. Each latch 156 is retained in its leftmost engaged position by a spring bias member 168 wrapped around the narrowed ends 164 to act against its associated sidewall 162 of the upper support and react against a retainer member 170 releasably carried at the end of the latch 156. It can be seen that the retainer 170 of the rightmost slide device 102 is suitably apertured for attaching the wire 110, the opposite end of which is connected directly to the opposite companion latch 156.

As can best be seen in FIG. 6, the handle assembly 112 comprises handle member 172 pivotally connected by a pin 174 and flange 176 to the upper support member of slide device 102. The handle 172 includes a leg 178 engaged with the latch 156 and arranged to provide a lateral movement to the latch 156. Spring biased member 180 is interconnected to the handle to normally bias the handle toward a counterclockwise position associated with the engaged position of the latches 156 with respect to racks 120.

It is therefore to be understood that we have described an improved adjustable mounting device having a movable support member adapted for attachment to a seat assembly and interconnected through a suitable slide device to a lower support member attached to the floor of the vehicle. The movable supports have means for attaching the lower terminal ends of a seat belt assembly. I have also described an improved seat mounting wherein the upper support member is provided with rigid downwardly depending flange sections straddling the lower fixed support member in a manner to maintain the slide assembly in a connected condition when subjected to high inertial forces tending to separate the slide devices. I have also described an improved seat mounting apparatus having a novel latch arrangement for interconnecting the upper support member directly to the lower support member to provide a rigid assembly able to withstand high transverse forces tending to separate the support members.

For purposes of illustration the embodiment of FIGS. 1 to 5 has a latch member 62 pivotally supported for movement into and out of engagement with the rack 38. This arrangement requires an elongated aperture 64 in the side walls of the upper support 42 which reduce the stress bearing properties of the upper support member. The embodiment illustrated in FIGS. 6 to 10 illustrate the latch members 156 arranged for lateral movement so that their associated apertures 158 and 160 need only have a dimension corresponding to the cross section of the latches 156, thereby minimizing the amount of material removed from the support member 162. Correspondingly the amount of material removed from the lower support members 114 to form the racks 120 is reduced thereby maintaining the high stress transfer characteristics of the lower support member.

It is also to be understood that we have described an improved seat mounting device wherein the rack and latch arrangement is remotely positioned from the slide arrangement so that the slide units which take the form of the roller members 50 and the elongated slots 54 in the first embodiment and the slide unit 126 in the second embodiment are not structurally weakened by the latch arrangement.

Although we have described but two preferred embodiments on our invention, it is to be understood that various changes and revisions can be made therein without departing from the spirit of the invention or the scope of the appended claims.

We claim:

1. A vehicle seat mounting assembly comprising:

a first elongated member having a generally channel shaped cross section including sides that extend parallel to its longitudinal axis and upper flange portions extending outwardly from the upper edges of said sides, support means connected to the first elongated member and adapted for fastening to the floor of the vehicle at a rearward end of said first elongated member, said support means provided with a series of abutments disposed adjacent the rearward end of said first elongated member, said abutments being formed along a line that is generally parallel to the longitudinal axis of the first elongated member, a second elongated member having a generally channel shaped cross section, said second elongated member having sides extending over the sides of the first elongated member and flange portions extending inwardly from the lower edges of said sides and disposed beneath the flanges of said first elongated member, and slide means disposed intermediate said flanges whereby said flanges lock said members together for relative sliding movement generally parallel to the longitudinal axes of said members, a channel shaped member having a midsection disposed above said second elongated member and being secured thereto, said channel shaped member further being provided with a pair of apertured sides depending from its midsection and extending over and below the sides of said second elongated member, a latch bar supported by the sides of said channel shaped member and extending through said apertured sides from a position beneath said first and second elongated members such that the channel shaped member and the latch bar encircle the first and second elongated members, said latch bar also extending through said support means at a point adjacent the area where said support means are connected to the floor of the vehicle, said latch bar being movable between a first position with respect to the channel shaped member in which it is engaged with a selected one of said series of abutments to lock the second elongated member against motion with respect to the first elongated member in directions parallel to said longitudinal axis and to aid in locking said first and second elongated members against separation in directions transverse to the longitudinal axes of said members, and a second position in which it is disengaged from said abutments to permit sliding longitudinal motion of said second elongated member with respect to said first elongated member but remains in a position extending through the sides of said channel shaped member and through said support means to aid in locking said members together, means on said channel shaped member for mounting a seat assembly thereto whereby said seat assembly is movable with said second elongated member and said channel shaped member.

2. The vehicle seat mounting assembly of claim 1 and in which said latch bar is movable with respect to the first elongated member only in a plane that is parallel to the longitudinal axis of the first elongated member and with respect to the second elongated member only along an axis that is in the plane of its motion with respect to the first elongated member.

3. A seat mounting assembly as defined in claim 1 and including means for attaching a seat belt to said channel shaped member closely adjacent a vertical plane through said latch bar.

4. A seat mounting assembly as defined in claim 1, including means normally biasing said latch bar toward its first position.

5. A seat mounting assembly as defined in claim 1, including means for attaching a seat belt to one of said members in proximate relationship to the latch.

6. A seat mounting assembly as defined in claim 1, including means for attaching a seat belt to the channel shaped member such that the seat belt is movable with the channel shaped member as the second elongated member is moved with respect to the first elongated member.

References Cited

UNITED STATES PATENTS

| | | | |
|---|---|---|---|
| 2,100,546 | 11/1937 | Kramer | 248—429 XR |
| 2,240,143 | 4/1941 | Lustig | 248—430 XR |
| 2,351,778 | 6/1944 | Moulding | 248—430 |
| 2,614,608 | 10/1952 | Ardussi | 297—346 |
| 3,052,443 | 9/1962 | Lagstrom | 248—430 |
| 3,204,916 | 7/1965 | Pickles | 248—429 |
| 3,207,554 | 9/1965 | Dall. | |

FRANCIS K. ZUGEL, Primary Examiner

U.S. Cl. X.R.

248—420